(12) United States Patent
Takagi et al.

(10) Patent No.: US 8,329,283 B2
(45) Date of Patent: Dec. 11, 2012

(54) CARBON-BASED COMPOSITE MATERIAL AND PRODUCING METHOD THEREOF

(75) Inventors: Takashi Takagi, Ogaki (JP); Masahiro Yasuda, Ogaki (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 228 days.

(21) Appl. No.: 12/266,990

(22) Filed: Nov. 7, 2008

(65) Prior Publication Data

US 2009/0123696 A1 May 14, 2009

(30) Foreign Application Priority Data

Nov. 9, 2007 (JP) ................................. 2007-292470

(51) Int. Cl.
*B32B 3/10* (2006.01)
*B32B 3/30* (2006.01)
*B32B 38/04* (2006.01)

(52) U.S. Cl. .......... 428/172; 428/43; 428/136; 428/137; 428/138; 428/166; 428/167; 428/408; 428/920

(58) Field of Classification Search ........................ None
See application file for complete search history.

(56) References Cited

U.S. PATENT DOCUMENTS

| | | | | | |
|---|---|---|---|---|---|
| 2,009,966 | A | * | 7/1935 | Allen | 428/150 |
| 2,556,071 | A | * | 6/1951 | Denton | 428/134 |
| 2,653,889 | A | * | 9/1953 | Hager et al. | 428/155 |
| 3,001,902 | A | * | 9/1961 | Cooke et al. | 428/42.3 |
| 3,655,501 | A | * | 4/1972 | Tesch | 428/136 |
| 4,234,638 | A | * | 11/1980 | Yamazoe et al. | 428/133 |
| 4,601,937 | A | * | 7/1986 | Latussek | 428/132 |
| 4,690,793 | A | * | 9/1987 | Okamura et al. | 376/136 |
| 4,752,518 | A | * | 6/1988 | Lohrke et al. | 428/131 |
| 4,777,083 | A | * | 10/1988 | Ono et al. | 428/218 |
| 4,852,645 | A | * | 8/1989 | Coulon et al. | 165/180 |
| 4,888,242 | A | * | 12/1989 | Matsuo et al. | 428/408 |
| 4,911,983 | A | * | 3/1990 | Otani et al. | 428/408 |
| 5,017,431 | A | | 5/1991 | Otani et al. | |
| 5,032,349 | A | * | 7/1991 | Brandes et al. | 376/338 |
| 5,176,863 | A | * | 1/1993 | Howard | 264/113 |
| 5,182,075 | A | * | 1/1993 | Gotoh et al. | 376/150 |
| 5,390,217 | A | * | 2/1995 | Ioki et al. | 376/150 |
| 5,586,152 | A | | 12/1996 | Ioki et al. | |
| 5,985,464 | A | * | 11/1999 | Schmitt et al. | 428/457 |

(Continued)

FOREIGN PATENT DOCUMENTS

GB 1389367 4/1975

(Continued)

OTHER PUBLICATIONS

Causey et al., The use of silicon carbide as a tritium permeation barrier, Apr. 1995, Journal of Nuclear Materials, 220-222, 823-826.*

(Continued)

*Primary Examiner* — Maria Veronica Ewald
*Assistant Examiner* — Jeff Vonch
(74) *Attorney, Agent, or Firm* — Ditthavong Mori & Steiner, P.C.

(57) ABSTRACT

A carbon-based composite material includes a graphite substrate and a carbon-based sheet. The carbon-based sheet is adhered to a surface of the graphite substrate with a heat-resistant adhesive. The carbon-based sheet has at least one of slits and grooves.

13 Claims, 5 Drawing Sheets

U.S. PATENT DOCUMENTS

| | | | |
|---|---|---|---|
| 6,045,915 A * | 4/2000 | Bou et al. | 428/408 |
| 2003/0063887 A1* | 4/2003 | Seal et al. | 385/134 |
| 2005/0014428 A1* | 1/2005 | Zenker et al. | 442/2 |
| 2005/0254543 A1* | 11/2005 | Daimer | 373/18 |

FOREIGN PATENT DOCUMENTS

| | | | |
|---|---|---|---|
| JP | 59137378 A * | 8/1984 | |
| JP | 60151285 A * | 8/1985 | |
| JP | 60200870 A * | 10/1985 | |
| JP | 62-41446 U | 3/1987 | |
| JP | 63-112147 | 5/1988 | |
| JP | 3-000236 | 1/1991 | |
| JP | 03000236 A * | 1/1991 | |
| JP | 3-122064 | 5/1991 | |
| JP | 03122064 A * | 5/1991 | |
| JP | 2000-88985 A | 3/2000 | |
| JP | 2000103008 A * | 4/2000 | |
| WO | WO 2005/114079 | 12/2005 | |

OTHER PUBLICATIONS

Translation of JP 2000103008 A, Apr. 2000.*
English Abstract of JP 59-137378 A, Aug. 1984.*
Translation of JP 03-000236 A, Jan. 1991.*
Translation of JP 03-122064 A, May 1991.*
Japanese Office Action for corresponding JP Application No. 2007-292470, Dec. 20, 2011.

* cited by examiner

CARBON-BASED COMPOSITE MATERIAL AND PRODUCING METHOD THEREOF

CROSS-REFERENCE TO RELATED APPLICATION

The present application claims priority under 35 U.S.C. §119 to Japanese Patent Application No. 2007-292470, filed on Nov. 9, 2007. The contents of this application are incorporated herein by reference in their entirety.

BACKGROUND OF THE INVENTION

1. Field of the Invention

The present invention relates to a carbon-based composite material and a producing method of the carbon-based composite material.

2. Description of the Related Art

A graphite material has a sublimation point of about 3,600° C., so that it is in wide use as a member or the like constituting an inside of an apparatus or furnace such as a silicon single crystal pulling-up apparatus, a high-temperature treating furnace, a nuclear fusion reactor, a nuclear reactor or a hot press apparatus which becomes a non-oxidative atmosphere and a high-temperature environment.

Members used for these applications reach extremely high temperatures, so that they largely deform with thermal expansion. If a member made of the graphite material is arranged in a high-temperature portion and a member made of a different material (for example, metal, ceramic or the like) is arranged on the outside thereof to constitute the apparatus or furnace, a clearance occurs due to the difference in thermal expansion between the graphite member and the different member. Further, even in the case of parts of the apparatus or furnace constituted by only a plurality of graphite members having the same thermal expansion coefficient, if the temperature is uneven, uneven deformation occurs to cause the occurrence of a clearance. If the clearance occurs as described above, the different member constituted by the different material might be uncovered to be exposed to high temperatures. If the clearance occurs between the graphite member and the different member, thermal resistance from the graphite member to the different member might increase to abnormally overheat the graphite member. If the graphite member and the different member are restrained, there is a fear of the occurrence of thermal stress depending on the selection of temperature or material. Accordingly, the graphite member and the different member might be arranged with a clearance provided previously, and from the step before the temperature is applied, thermal resistance to the different member is liable to increase, which might cause the different member to tend to be exposed high temperatures.

In order to prevent the clearance caused by the difference in thermal expansion or the thermal stress, as described in JP-UM-A-62-41446 or JP-A-2000-88985, a technique has been performed in which a carbon-based sheet such as a sheet produced by sheet making of carbon fibers or an expanded graphite sheet is attached between the graphite members or between the graphite member and the different member.

These carbon-based sheets are liable to get wrinkled at the time of attachment to cause uneven in thickness. There have therefore been widely used carbon-based composite members in which the carbon-based sheet is adhered to the graphite member with a heat-resistant adhesive, in order to make it easy to attach the carbon-based sheet to the clearance between the graphite member and the different member.

SUMMARY OF THE INVENTION

According to aspects of the present invention, a carbon-based composite material includes a graphite substrate and a carbon-based sheet. The carbon-based sheet adhered to a surface of the graphite substrate with a heat-resistant adhesive. The carbon-based sheet has at least one of slits and grooves.

According to the configuration as described above, at least one of slits or grooves are formed on a surface of the carbon-based sheet, so that even if the difference in thermal expansion between the graphite substrate and the carbon-based sheet occurs, it can be absorbed by the slits or grooves. Therefore, there can be provided the carbon-based composite member which is decreased in separation of the carbon-based sheet from the graphite substrate, or the occurrence of cutting, breakage or the like of the carbon-based sheet, even under a high-temperature environment, and can maintain a good adhesive state.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Figure 1:
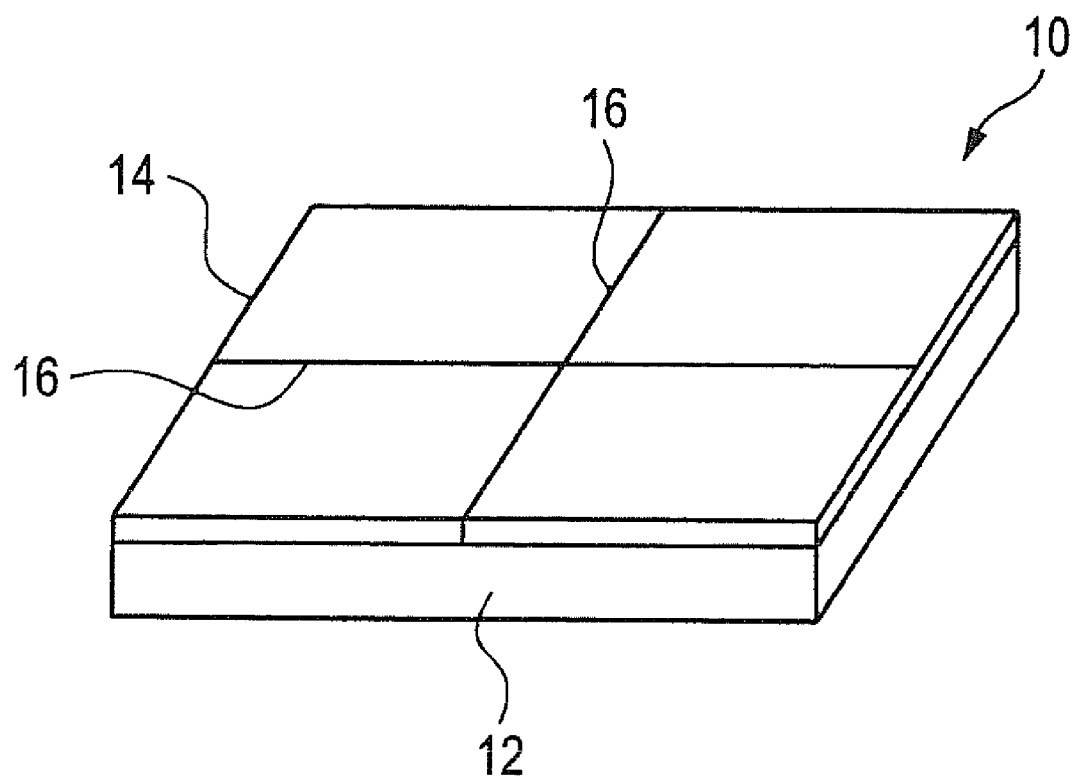
FIG. 1 is a schematic view showing an embodiment of a carbon-based composite member according to the present invention.

The embodiments will now be described with reference to the accompanying drawings, wherein like reference numerals designate corresponding or identical elements throughout the various drawings.

In a conventional carbon-based composite member in which the carbon-based sheet is adhered to the graphite member with the heat-resistant adhesive as previously described, when the graphite member is exchanged, a part of the carbon-based sheet deteriorated by use might be separated and drops off to fall to a bottom portion of the apparatus, which poses a problem of failing to easily take out it. With recent growth in size and complexity of the apparatus, it becomes difficult to easily disassemble and clean the apparatus, and a carbon-based composite member which would not cause such separation even after use has come to be desired.

Embodiments of the present invention have been made in view of such problems and provide a carbon-based composite member including a graphite substrate and a carbon-based sheet adhered to a surface of the graphite substrate with a heat-resistant adhesive, in which separation, breakage or the like of the carbon-based sheet in a carbonization stage of the adhesive by heat treatment at the time of production or under a high-temperature environment at the time of use is decreased.

Exemplary embodiments of carbon-based composite members according to the present invention will be described below with reference to the drawings. A schematic view of a carbon-based composite member 10 according to this embodiment is shown in FIG. 1. The carbon-based composite member 10 shown in FIG. 1 is obtained by joining a carbon-based sheet 14 is adhered to a surface of a graphite substrate 12 with a heat-resistant adhesive.

As the graphite substrate 12, there can be used a graphite material which has been generally used as a member made of graphite constituting an inside of an apparatus or furnace such as a silicon single crystal pulling-up apparatus, a high-temperature treating furnace, a nuclear fusion reactor, a nuclear reactor or a hot press apparatus.

Such graphite materials may include a graphite material produced by a method such as injection molding, an isotropic graphite material produced by pulverizing a raw material to tens of microns or less and using a method such as a cold isostatic press (CIP), and the like.

The carbon-based sheet 14 may be any sheet, as long as the sheet is formed by carbon having elasticity. Specifically, there can be used an expanded graphite sheet, a fibrous sheet obtained by sheet making or weaving of carbon fibers or graphite fibers, a fibrous sheet obtained by impregnating the above-mentioned fibrous sheet with a phenol resin or the like, followed by curing and burning, or the like. It is preferable to use the carbon-based sheet which has the thermal expansion coefficient in a plane direction smaller than that of the graphite substrate.

Among such sheets, the expanded graphite sheet is inexpensive, has appropriate elasticity, and has high thermal conductivity because natural graphite is used as a raw material, so that it can be suitably utilized as the carbon-based sheet. As the expanded graphite sheet, a commercially available sheet can be used, and examples thereof include an expanded graphite sheet (trade name: Expanded Graphite Sheet TG-411 or GTA) manufactured by GrafTech International Ltd.

It is noted that at least one of slits and grooves are formed on the carbon-based sheet 14. The term "slit" as used herein means one which passes through front-back both sides of the carbon-based sheet. The term "groove" means one which is formed only on either a front side or a back side of the carbon-based sheet, and does not pass through the front-back both sides thereof.

As described above, in the carbon-based composite member including the graphite substrate and the carbon-based sheet adhered to the graphite substrate, a part of the carbon-based sheet might be separated and drops off.

It is conceivable that such a phenomenon is for the following reason. That is, in graphite fiber or a graphite sheet, the a axis of a crystal tends to be aligned in a fiber direction or in a plane direction, so that a graphite sheet produced using carbon fibers or graphite fibers as a raw material or an expanded graphite produced by expanding natural graphite is strongly aligned in a plane direction. Accordingly, the thermal expansion coefficient in the plane direction of the graphite sheet is liable to become smaller than the thermal expansion coefficient in a plane direction (about $4 \times 10^{-6}$/K) of a graphite member produced by a method such as a cold isostatic press (CIP). In particular, the thermal expansion coefficient in the plane direction of the expanded graphite sheet is about $-0.4 \times 10^{-6}$/K, which is very small compared to the thermal expansion coefficient of the graphite member to which the graphite sheet is adhered. From such difference in the thermal expansion coefficient, it is conceivable that tension is applied in a layer direction by heating to cause cutting of the carbon-based sheet or breakage due to shear force, resulting in dropping off of fragments of the carbon-based sheet.

Such a phenomenon occurs not only in a furnace or apparatus in which the carbon-based composite member is used, but also in a production stage of the carbon-based composite member in which similar heat treatment is conducted.

In this embodiment, at least one of the slits and grooves are formed on the carbon-based sheet 14. The tension generated on a surface of the carbon-based sheet can be absorbed by forming at least one of the slits or grooves on the carbon-based sheet. Even if the difference in thermal expansion between the graphite substrate and the carbon-based sheet occurs, the difference in thermal expansion can be absorbed by the slits or grooves, thereby being able to prevent separation, cutting, breakage or the like of the carbon-based sheet.

Although the slits or grooves may be in a lattice form, a hexagonal form or the like, the lattice form as shown in FIG. 1 is preferred because of easy processability.

Figure 3:
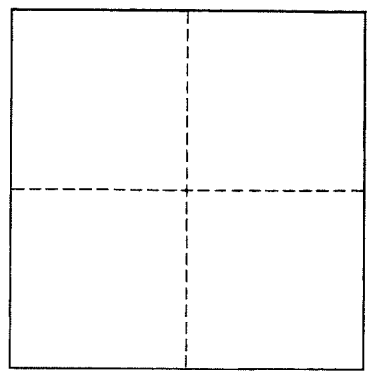
FIG. 3 is a plan view showing a carbon-based sheet according to the embodiment.

The slits or grooves may be formed in a perforation form as shown in FIG. 3. As for the perforation distance, the slits or grooves are desirably constituted to such a degree that the sheet is broken along the perforation, when tension is applied in a direction perpendicular to the perforation, for example, approximately at a ratio of 30% or more based on the entire length of the perforated portion.

Figure 4A:
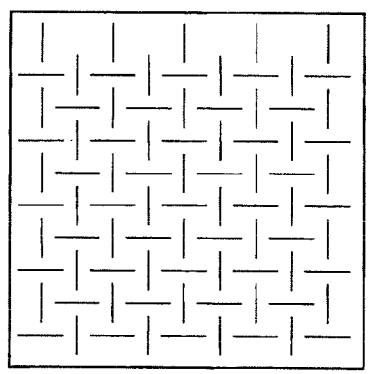
FIGS. 4A to 4C are plan views showing other carbon-based sheets according to the embodiment.
Figure 4B:
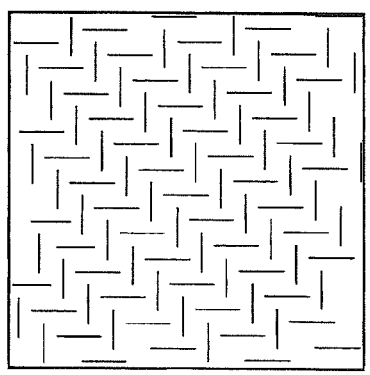
Figure 4C:
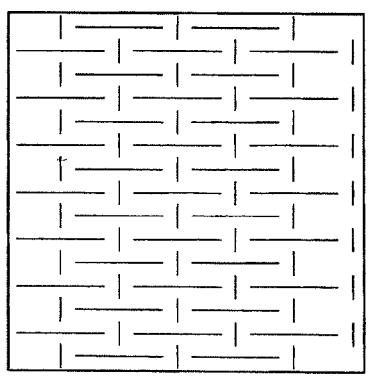

Further, as for the shape of the slits or grooves, they may also be formed in a plain-woven form, a twill form and a satin weave form as shown in FIGS. 4A to 4C, respectively. In these methods, the slits are formed on a single sheet, so that it is easy to form the slits before adhesion to the graphite substrate.

Figure 5:
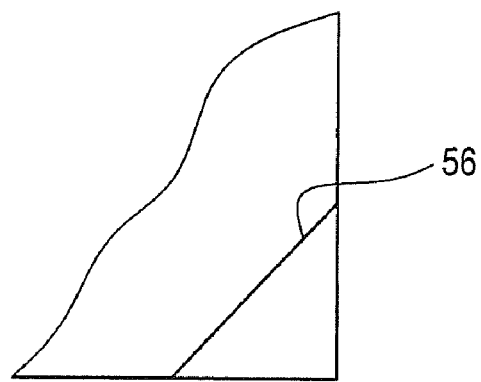
FIG. 5 is a partially enlarged view of a carbon-based sheet according to the embodiment.
Figure 6:
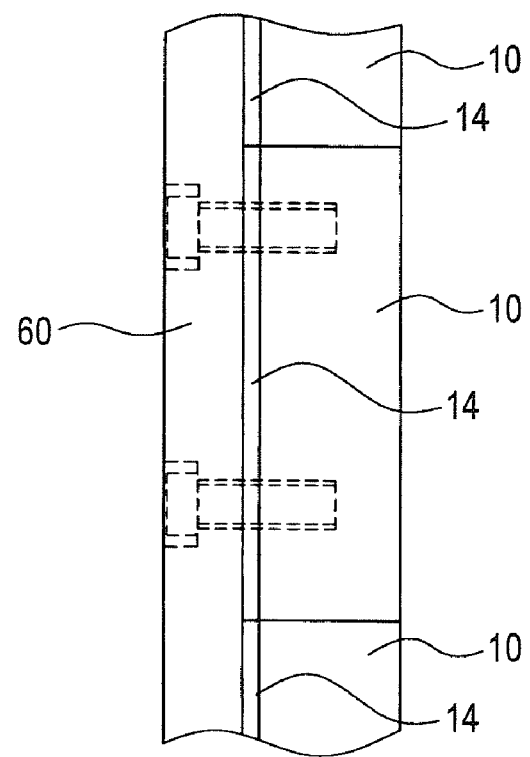
FIG. 6 is a view showing a use example of a carbon-based sheet according to the embodiment.

Furthermore, a slit (or a groove) 56 may be diagonally formed so that a corner portion of the carbon-based sheet becomes triangular, as shown in FIG. 5. The dropping-off and the like of the corner portion can be prevented by diagonally forming the silt in the corner portion.

The slits or grooves are desirably formed so that there is no long straight line not intersecting the slits or grooves, on the carbon-based sheet. For example, the maximum linear distance between the slits or grooves is preferably about 80 mm or less, and more preferably 72 mm or less. Since the maximum linear distance between the slits or grooves is about 80 mm or less, separation and the like of the carbon-based sheet would be more surely prevented.

The term "the linear distance between the slits or grooves" as used herein means the length of a straight line not intersecting another slit or groove, of lines connecting the slits or grooves with each other. That is, when a point on an arbitrary slit or groove is taken as point A and a point on another arbitrary slit or groove is taken as point B, "the linear distance between the slits or grooves" means the length of segment AB at the time when there is no other slit or groove intercepting segment AB.

Figure 2A:
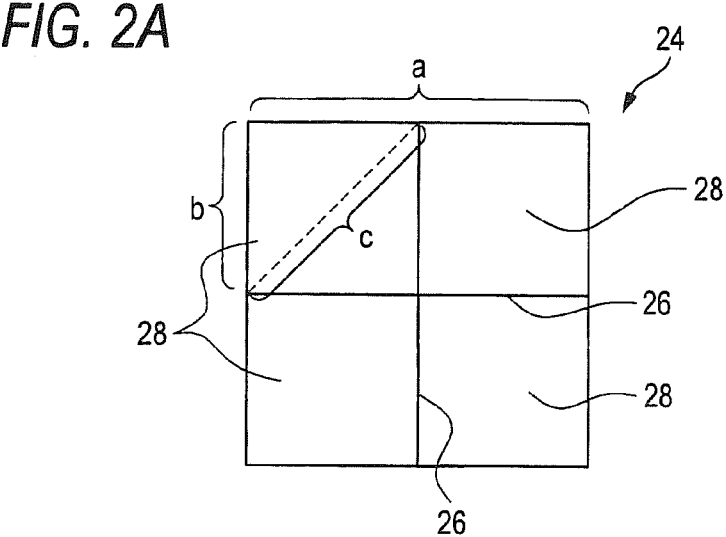
FIG. 2A is a plan view showing a carbon-based sheet in which slits or grooves are formed in a lattice form.

This point will be described in more detail taking a configuration (lattice-formed slits or grooves) shown in FIG. 2A as an example. FIG. 2A shows a plan view of a carbon-based sheet 24 in which slits or grooves are formed in a lattice form. This carbon-based sheet 24 is a square, 100 mm on a side. On this carbon-based sheet 24, the slits or grooves 26 are formed in a lattice form, thereby dividing the carbon-based sheet 24 into a divided sheet 28 of four squares. On this carbon-based sheet 24, the maximum value of the linear distance between the slits or grooves 26 (the maximum value of the length of a straight line connecting the slits or grooves with each other and not intersecting another slit or groove) is the length c of a diagonal line of the divided sheet 28. The length b of a side of the divided sheet 28 is 50 mm, so that the length c of the diagonal line is about 71 mm. Accordingly, in this case, the maximum linear distance between the slits or grooves is 80 mm or less.

Figure 2B:
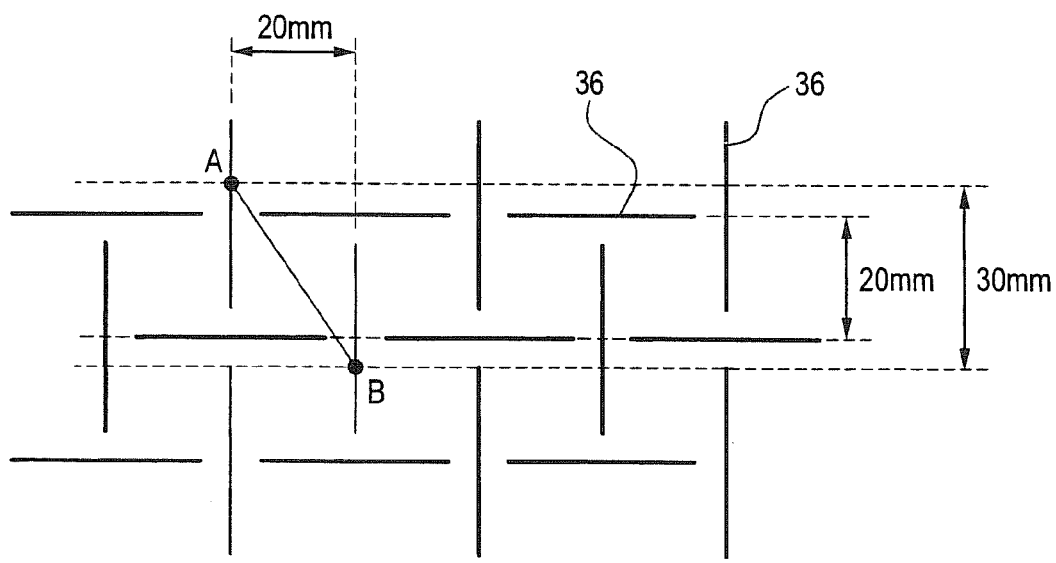
FIG. 2B is a plan view showing a carbon-based sheet in which slits or grooves are formed in a plain-woven form.

Further, the case of the slits or grooves in a plain-woven form is shown in FIG. 2B. In FIG. 2B, reference numeral 36 indicates the slits or grooves. Broken lines are additional lines for indicating the length of the slit or groove and the distance therebetween.

In the case of the plain-woven form, the maximum linear distance between the slits or grooves corresponds to the length of a straight line connecting point A and point B in FIG. 2B. When the distance between a vertical line and a horizontal line constituting the slits or grooves 36 is taken as, for example, 5 mm, and the distance between the vertical lines or horizontal lines is taken as 20 mm, as shown in FIG. 2B, the length of the straight line connecting point A and point B is $\sqrt{(20^2+30^2)} \approx 36$ mm. In this case, the maximum linear distance between the slits or grooves is also 80 mm or less.

As described above, in the case of the plain-woven form, the twill form, the satin weave form and the like, the maximum linear distance between the slits or grooves can be defined to 80 mm or less by finely making the slits or grooves.

The thickness of the carbon-based sheet is not particularly limited. However, when it is used as a wall material of the above-mentioned apparatus or furnace, the thickness is preferably 0.1 mm or more, in order to give proper elasticity. Further, the upper limit thereof is preferably 3 mm or less, because the sheet which is too thick results in an increase in thermal resistance.

If the carbon-based composite member according to this embodiment is used as a constituent member of the silicon single crystal pulling-up apparatus, the nuclear fusion reactor, the nuclear reactor or the like, it is preferred that the graphite substrate and the carbon-based sheet are high-purity ones from which impurities are removed.

The content of impurities in the graphite substrate and the carbon-based sheet is preferably 20 ppm or less. In particular, if the graphite substrate and the carbon-based sheet are used as the constituent member of the nuclear reactor, the boron content of the graphite substrate and the carbon-based sheet is preferably 5 ppm or less, and more preferably 1 ppm or less.

The heat-resistant adhesive may be any adhesive, as long as it is a resin which can be carbonized by heat treatment in a non-oxidative atmosphere, and there can be utilized, for example, a condensed polynuclear aromatic (COPNA) resin, a phenol resin, divinylbenzene, a furan resin, an imide resin and the like. These are used by being carbonized with heat treatment in the non-oxidative atmosphere. Among these, the COPNA resin is excellent in terms of adhesive force and ease of handling. For this reason, the temperature can be rapidly elevated without the occurrence of cracks, separation and wrinkles in the course of carbonization after the adhesion of the carbon-based sheet. Moreover, strong adhesive force can be maintained even after use in the furnace or apparatus.

The COPNA resin is a thermosetting composition obtained by combining a condensed polycyclic aromatic compound mainly having a bicyclic or higher cyclic structure, an aromatic crosslinking agent including a monocyclic, bicyclic or higher cyclic aromatic having two or more groups of at least one kind of a hydroxymethyl group and a halomethyl group, and an acid catalyst.

The condensed polycyclic aromatic compounds mainly having a bicyclic or higher cyclic structure include, for example, one or a mixture of two or more selected from naphthalene, anthracene, phenanthrene, pyrene, chrysene, naphthacene, acenaphthene, acenaphthylene, perylene, coronene and derivatives having them as a main skeleton, or coal or petroleum heavy oil, tar, pitch and the like.

The acid catalysts include one or a mixture of two or more selected from aluminum chloride, boron fluoride, sulfuric acid, phosphoric acid, an organic sulfonic acid, a carboxylic acid and derivatives thereof.

The aromatic crosslinking agents each including a monocyclic, bicyclic or higher cyclic aromatic having two or more groups of at least one kind of a hydroxymethyl group and a halomethyl group, include, for example, p-xylene dichloride, 1,4-benzenedimethanol (p-xylene glycol) and 9,10-anthracenedimethanol.

The COPNA resin may contain a solvent for decreasing the softening point or a plasticizer, in addition to the above-mentioned main components. Further, in order to improve the carbonization yield, coke or graphite powder may be added to increase the amount.

A method for producing the carbon-based composite member according to the embodiment of the invention will be shown below.

(Application of Adhesive)

A graphite substrate processed into a shape conformed to its use application is prepared, and an adhesive is applied (coated) to a surface of this graphite substrate, to which a carbon-based sheet is adhered. As a method for applying the adhesive, there may be used a method such as spray coating, brush coating or dropping. The adhesive may be applied onto the whole surface or only partially applied. If slits are formed before curing of the adhesive, the resin can be prevented from flowing out of the slits in a curing step of the adhesive by applying the adhesive at positions avoiding the slits.

The coating temperature is preferably a temperature (generally, about 100° C. or lower) equal to or lower than the curing initiation temperature. If the adhesive such as the COPNA resin which is solid at ordinary temperature is used, it is preferred that the graphite substrate and the adhesive are previously heated to a temperature equal to or higher than the melting point of the adhesive before coating.

(Adhesion and Curing of Adhesive)

The carbon-based sheet is adhered (joined) to the graphite substrate. Then, pressure is applied by a clamp or the like, and the temperature is maintained at a temperature equal to or higher than the curing temperature of the adhesive to perform curing. An adhesive layer is thinned and widened by performing curing while applying pressure, thereby being able to realize stronger adhesion. The temperature and time necessary for curing vary depending on the kind of resin used. For example, in the case of the COPNA resin, it is necessary to perform treatment at 200° C. for about 30 minutes.

As for how to apply the temperature up to the highest treatment temperature, in the case of the COPNA resin which is difficult to foam, treatment may be performed in a temperature-controlled chamber previously heated to the treatment temperature. In the case of the phenol resin or the like which produces a reaction product in large amount to easily foam, it is preferred that heating is conducted at a rate of temperature increase of about 2° C./hour to perform curing while maintaining the temperature at a temperature (about 200° C.) equal to or higher than the curing temperature of the adhesive.

(Carbonization Step)

The carbon-based composite member prepared along the above-mentioned step is carbonized so that no gas is generated at high temperatures at the time of use. In some usage in which generated gas does not particularly cause any hindrance, the carbon-based composite member may be installed in the furnace to use without this carbonization step. In the carbonization step, the carbon-based composite member is heated at least at a temperature equal to or higher than the temperature which it receives at the time of use to previously remove generated gas.

(Slit or Groove Formation Step)

Slits or grooves may be formed in any step, depending on the shape of slits or grooves formed. If the slits are formed in a plain-woven form, a twill form, a satin weave form or the like, the carbon-based sheet is not divided by formation of the slits. Therefore, they may be formed in any step.

If the grooves are formed only on a back side, it is required to form the grooves before adhesion.

If the slits are formed by plural division in a lattice form, a hexagonal form or the like, the slits may be formed by cutting out the carbon-based sheet into a shape such as a square, a rectangle or a hexagon, arranging the cut-out sheet on the graphite substrate and adhering it thereto, or by adhering the carbon-based sheet to the graphite substrate, and then, making cuts in a lattice form or a hexagonal form using a cutter or the like. The latter is better in workability. When performed after adhesion, this step may be carried out in any step before the carbonization step.

(Highly-Purifying Step)

The carbon-based composite member thus prepared is highly purified depending on the use thereof. The highly-purifying treatment may be conducted by a method which has hitherto been known. For example, the treatment can be conducted, allowing a halogen gas or a halogenated hydrocarbon gas to flow in a high-temperature furnace of about 2,000° C.

The carbon-based composite member described above according to the embodiment of the present invention can be suitably used as a member (for example, a heat insulating tube, a heat insulating material, a tight box or a wall material) constituting an inside of an apparatus or furnace such as a silicon single crystal pulling-up apparatus, a high-temperature treating furnace, a nuclear fusion reactor, a nuclear reactor or a hot press apparatus.

For example, if the carbon-based composite member according to the embodiment of the present invention is used as the wall material of the nuclear fusion reactor, the nuclear reactor or the like, the carbon-based composite member is processed into a tile form, about 10 to 100 mm on a side, and then, the carbon-based composite member 10 is disposed so that the side of the carbon-based sheet 14 comes into contact with a metal wall surface 60, followed by bolting, thereby being able to use it as the wall material.

The carbon-based composite member according to the embodiment of the present invention will be described in more detail with reference to the following examples, but should not be construed as being limited thereto.

Example 1

A graphite substrate was prepared by processing an isotropic graphite material, ET-10 (trade name), manufactured by Ibiden Co., Ltd. into a size of 100×100×20 mm was prepared.

This graphite substrate was heated at 80° C., and 10 g of a COPNA resin heated at the same temperature was applied to a surface of 100×100 mm.

The COPNA resin contained p-xylene glycol, pitch and p-toluenesulfonic acid as main components. The softening point of the COPNA resin was decreased with α-methylnaphthalene.

Then, an expanded graphite sheet, which is Expanded Graphite Sheet TG-411 (trade name) manufactured by GrafTech International Ltd., of 100×100×0.8 mm was adhered to the surface on which the COPNA resin was applied. An iron plate having a thickness of 10 mm was placed thereon, and allowed to stand in a temperature-controlled chamber of 200° C. for 30 minutes with the graphite substrate and the iron plate clamped to cure the COPNA resin.

Further, cuts passing through the expanded graphite sheet were made in a lattice form with a distance of 50 mm to form slits in the expanded graphite sheet.

Figure 7:
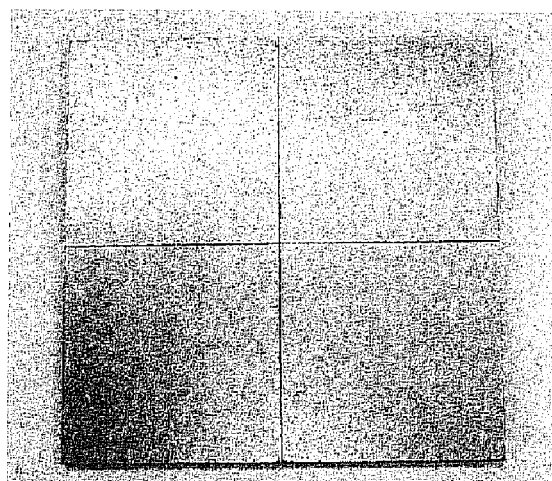
FIG. 7 is a view showing a carbon-based composite member after an evaluation test in Example 1.

The carbon-based composite member thus formed was placed in a furnace, and treated at 2,000° C. for 3 hours. In the carbon-based composite member taken out from the furnace, separation and the like was not observed on the surface of the member. Then, the carbon-based composite member was pinched with a pair of test jigs of 150×150×30 mm made of an isotropic graphite material, and four corners of the test jigs were fastened with bolts made of a carbon fiber-reinforced carbon composite material. After keeping at 1,500° C. for 5 hours, a test for evaluating separation of the carbon-based sheet, and the like was performed. Even after this evaluation test, separation, cracks and the like were not observed. The carbon-base composite member after the evaluation test is shown in FIG. 7.

Example 2

After the COPNA resin was applied onto the graphite substrate, the expanded graphite sheet was adhered to the graphite substrate, and the COPNA resin was cured, in the same manner as in Example 1.

Further, cuts were made in a lattice form with a distance of 50 mm so as not to pass through the expanded graphite sheet to form grooves on the expanded graphite sheet.

The carbon-based composite member thus formed was placed in a furnace, and treated at 2,000° C. for 3 hours. In the carbon-based composite member taken out from the furnace, separation and the like was not observed on the surface of the member. Then, the same evaluation test as in Example 1 was performed. Even after this evaluation test, separation, cracks and the like were not observed.

Example 3

The COPNA resin was applied on the graphite substrate in the same manner as in Example 1 described above.

Four expanded graphite sheets of 50×50×0.8 mm were adhered with no space therebetween to the surface on which the COPNA resin was applied. An iron plate having a thickness of 10 mm was placed thereon, and allowed to stand in a temperature-controlled chamber of 200° C. for 30 minutes with the graphite substrate and the iron plate clamped to cure the COPNA resin.

The carbon-based composite member thus formed was placed in a furnace, and treated at 2,000° C. for 3 hours. In the carbon-based composite member taken out from the furnace, separation and the like was not observed on the surface of the member. Then, the same evaluation test as in Example 1 was performed. Even after this evaluation test, separation, cracks and the like were not observed.

Comparative Example 1

After the COPNA resin was applied onto the graphite substrate, the expanded graphite sheet was adhered thereto, and the COPNA resin was cured, in the same manner as in Example 1. No slit or groove was formed on the expanded graphite sheet.

Figure 8:
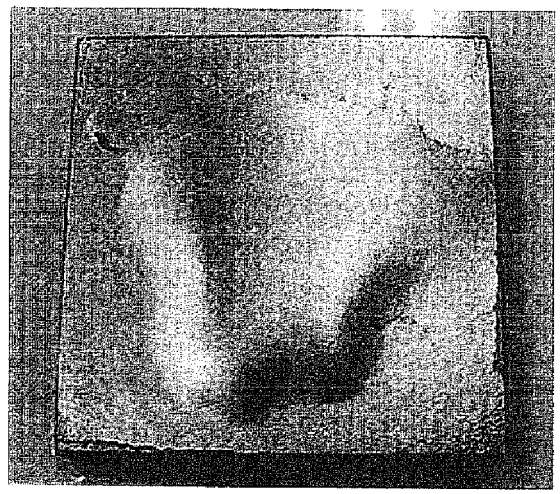
FIG. 8 is a view showing a carbon-based composite member after treatment at 2,000° C. for 3 hours in Comparative Example 1.

The carbon-based composite member thus formed was placed in a furnace, and treated at 2,000° C. for 3 hours. For the carbon-based composite member taken out of the furnace, separation was observed on the surface of the member. The carbon-based composite member in which separation occurred is shown in FIG. 8.

Comparative Example 2

After the COPNA resin was applied onto the graphite substrate, the expanded graphite sheet was adhered thereto, and the COPNA resin was cured, in the same manner as in Example 1. Then, punching was performed on the expanded graphite sheet at intervals of 4 mm.

Figure 9:
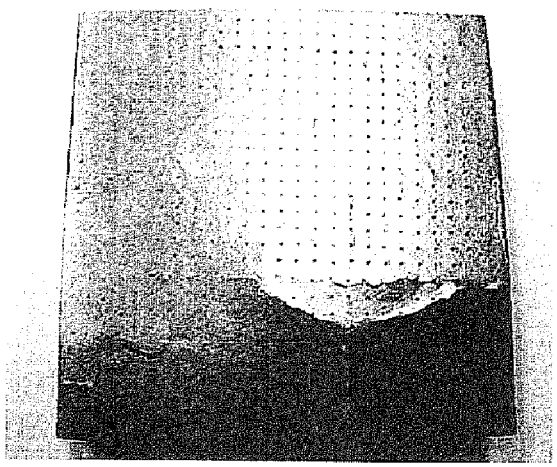
FIG. 9 is a view showing a carbon-based composite member after an evaluation test in Comparative Example 2.

The carbon-based composite member thus formed was placed in a furnace, and treated at 2,000° C. for 3 hours. In the carbon-based composite member taken out of the furnace, separation was not observed on the surface thereof. Then, the same evaluation test as in Example 1 was performed. After this evaluation test, the occurrence of separation was observed. The carbon-based composite member in which separation occurred is shown in FIG. 9.

While the present invention has been shown and described with reference to certain exemplary embodiments thereof, it will be understood by those skilled in the art that various changes in form and details may be made therein without departing from the spirit and scope of the invention as defined by the appended claims.

In the embodiments described above, either one of slits or grooves are formed on the carbon-based sheet. However, this is not limited thereto. Both slits and grooves may be formed on the carbon-based sheet.

Obviously, numerous modifications and variations of the present invention are possible in light of the above teachings. It is therefore to be understood that within the scope of the appended claims, the invention may be practiced otherwise than as specifically described herein.

What is claimed is:

1. A carbon-based composite material comprising:
a graphite substrate having a surface; and
a carbon-based sheet having a first surface adhered to the surface of the graphite substrate with a heat-resistant adhesive, the carbon-based sheet having grooves,
wherein the carbon based sheet is not divided into separate sheets by the grooves,
wherein the carbon-based sheet has a second surface that is planar and is opposite the first surface,
wherein the grooves extend from the second surface within the carbon-based sheet toward the first surface, and the grooves do not extend from the second surface to the first surface,
wherein at least one first groove extends linearly in a first direction along the second surface,
wherein at least one second groove extends linearly in a second direction along the second surface, the second direction being substantially perpendicular to the first direction,
wherein the at least one first groove and at least one second groove do not intersect with each other, and
wherein the carbon-based sheet comprises an expanded graphite sheet.

2. The carbon-based composite material according to claim 1, wherein a maximum linear distance between each of the grooves is about 80 mm or less.

3. The carbon-based composite material according to claim 1, wherein the grooves are formed in a lattice pattern, a plain-woven form, a twill form, or a satin weave form.

4. The carbon-based composite material according to claim 1, wherein the adhesive comprises a COPNA resin.

5. The carbon-based composite material according to claim 1, wherein the grooves are formed as perforations.

6. The carbon-based composite material according to claim 1, wherein the second surface of the carbon-based sheet is configured to contact a metal wall surface.

7. A carbon-based composite material comprising:
a graphite substrate having a surface; and
a carbon-based sheet having a first surface adhered to the surface of the graphite substrate with a heat-resistant adhesive, the carbon-based sheet having grooves,
wherein the carbon-based sheet is not divided into separate sheets by the grooves,
wherein the grooves extend from the first surface toward a second surface of the carbon-based sheet that is opposite to the first surface, and the grooves do not extend from the first surface to the second surface,
wherein at least one first groove extends linearly in a first direction along the first surface,
wherein at least one second groove extends linearly in a second direction along the first surface, the second direction being substantially perpendicular to the first direction,
wherein the at least one first groove and the at least one second groove do not intersect with each other, and
wherein the carbon-based sheet comprises an expanded graphite sheet.

8. The carbon-based composite material according to claim 7, wherein a maximum linear distance between each of the grooves is about 80 mm or less.

9. The carbon-based composite material according to claim 7, wherein the grooves are formed in a lattice pattern, a plain-woven form, a twill form, or a satin weave form.

10. The carbon-based composite material according to claim 7, wherein the adhesive comprises a COPNA resin.

11. The carbon-based composite material according to claim 7, wherein the grooves are formed as perforations.

12. The carbon-based composite material according to claim 7, wherein the second surface of the carbon-based sheet is configured to contact a metal wall surface.

13. The carbon-based composite material according to claim 7, wherein the first surface of the carbon-based sheet is planar, and wherein the grooves extend from the first surface within the carbon-based sheet toward the second surface of the carbon-based sheet.

* * * * *